Aug. 7, 1928.  M. LOUGHEAD  1,679,484
BRAKE SHOE AND MOUNTING THEREFOR
Filed March 17, 1927   2 Sheets-Sheet 2
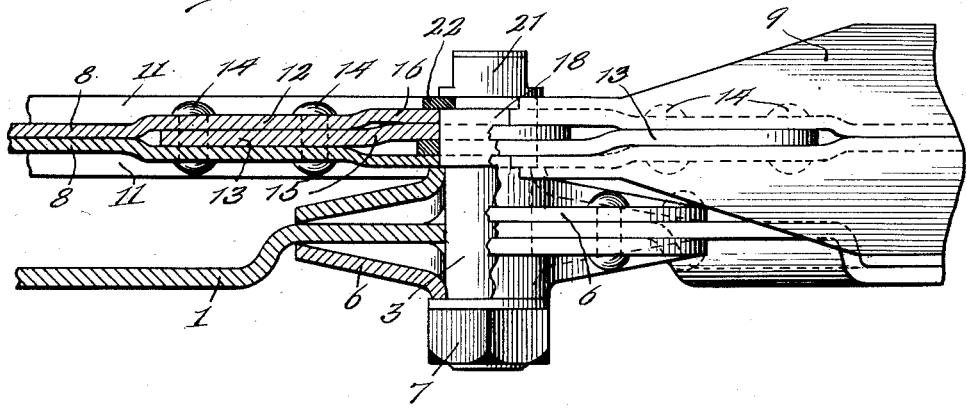
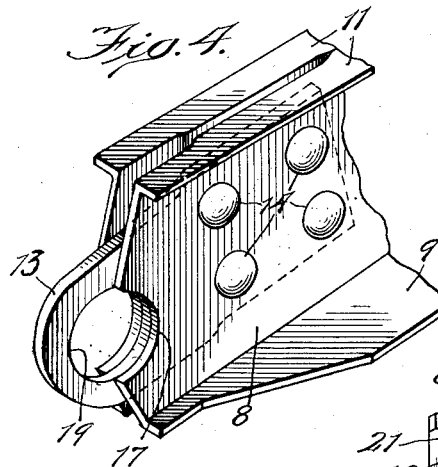
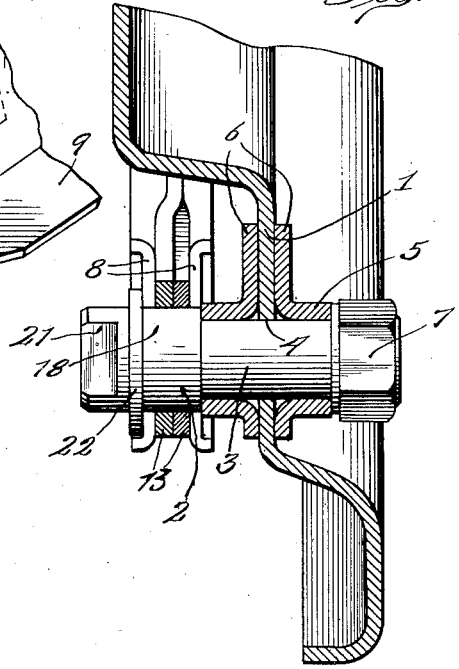

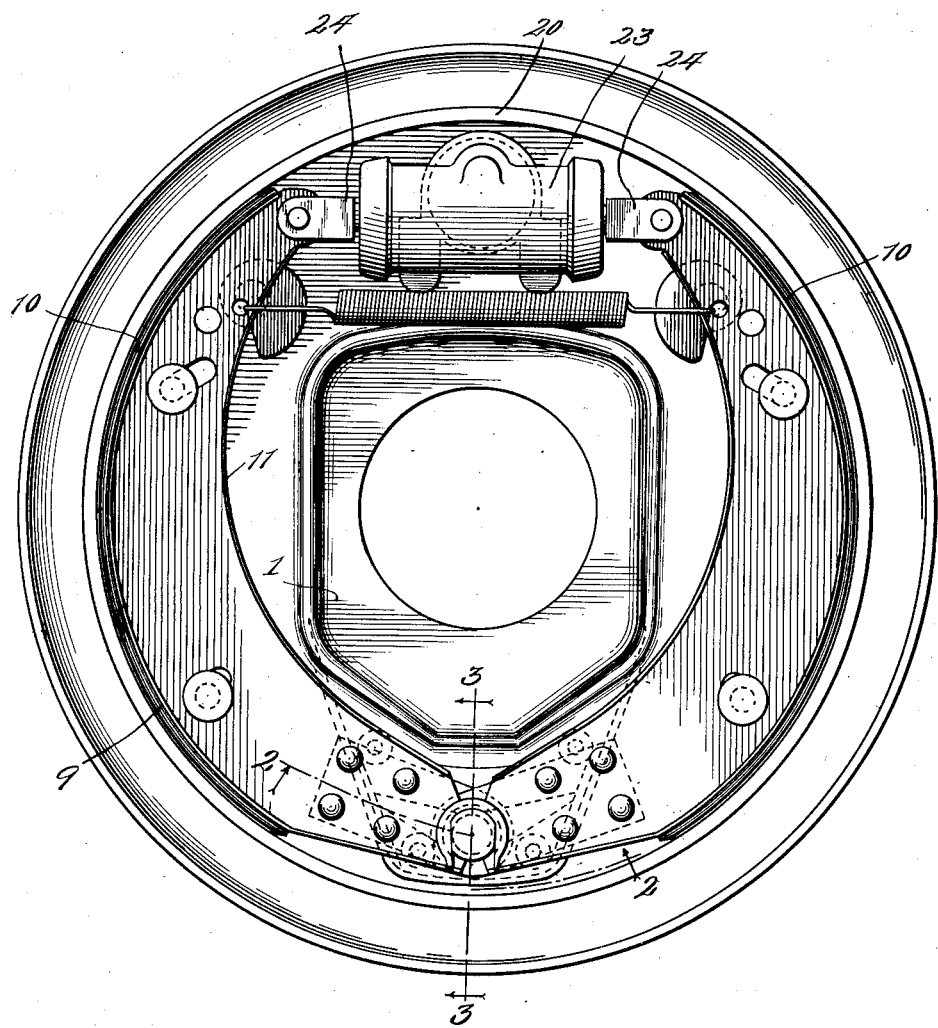

Patented Aug. 7, 1928.

1,679,484

UNITED STATES PATENT OFFICE.

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA.

BRAKE SHOE AND MOUNTING THEREFOR.

Application filed March 17, 1927. Serial No. 175,957.

My invention relates to improvements in brake shoes, and more particularly to the means for mounting the brake shoe in an internal brake mechanism.

An object of the invention is to provide a brake shoe and mounting of the character described in which means is provided for precluding movement of the shoe with the brake drum when the brake is applied.

Another object of the invention is to provide a brake shoe of the character described constructed of pressed metal in which ample surface is provided for the thrust bearing of the shoe upon the brake shoe mounting pin.

A further object of the invention is to provide a brake shoe and mounting, in which the bearing members interlock so as to prevent lateral movement of the shoes with respect to one another.

A further object of the invention is to provide a brake shoe in which the interlocking members are interchangeable as between the left and right shoe, thus reducing the cost of manufacture.

Other objects and advantages will be more particularly pointed out in the following description.

In the drawing Fig. 1 is an elevation of the brake mechanism in which my improved brake shoe and mounting are shown, Fig. 2 is a sectional view along the line 2—2 of Fig. 1, Fig. 3 is a sectional view along the line 3—3 of Fig. 1, and Fig. 4 is an enlarged fragmentary view of one of the brake shoes.

In carrying out my invention I provide the ordinary type of stationary dust pan 1, upon which a brake shoe mounting pin 2 is supported, so as to extend laterally therefrom at a point adjacent to the lower peripheral edge of the pan. The pin has a reduced portion 3, which is projected through an opening 4 in the pan 1. Means for mounting the pin is provided in collar portions 5 formed in a pair of plates 6 which are secured to opposite sides of the pan 1. The pin is held securely against movement with respect to the pan upon the tightening of a nut 7 at the inner end of the pin.

My improved brake shoe consists of a pair of abutting pressed steel members 8 having laterally extending flanges 9 at their outer edges, which form a contiguous supporting surface for brake lining 10. In Fig. 1, I have shown the general outline of the brake shoes which are somewhat the shape of a crescent, having their lower ends of greater width to compensate for strain thereupon when in use.

The plates 8 are securely fixed to one another and are provided also with lateral extending flanges 11 at their inner edges for the purpose of lending additional rigidity thereto.

The lower ends of the shoes have their plates 8 spread apart from one another as shown at 12 for a distance sufficient to permit the disposition of an insert plate 13 therebetween. This plate 13 is securely fixed to the portions 12 by a plurality of rivets 14.

The plates, as reference to Figs. 2 and 4 will show, are each offset at 15 and corresponding offset portions 16 are formed in each of the plates 8. This structure permits portions of the insert plates 13 to contact laterally with one another when the adjacent ends of the plates 8 of each of the two shoes are in longitudinal registration with one another, as when mounted upon the pin.

The plates 8 have thrust bearing portions 17 which bear directly upon a bearing portion 18 of the pin 2. (See Fig. 4.) The inserts 13 have openings therethrough forming bearing portions 19 which encompass the portion 18 of the pin.

It will be noted that I have here provided thrust bearing surface equivalent to the combined width of the plates 8 and one of the plates 13 for each of the shoes, as well as positive means for preventing longitudinal movement of the shoes with the brake drum 20.

The pin 2 has an enlarged head portion 21 against which a lock washer 22 is disposed for holding the interlocked portions of the shoes in place upon the pin (see Fig. 3).

Means for operating the brake shoes is provided in a hydraulic brake shoe operating mechanism generally indicated at 23, having brake shoe operating rods 24 which move apart from one another upon the application of fluid under pressure to the cylinders forming a part of the mechanism 23. Such mechanism as I have indicated at 23 is fully described and set forth in my Patent No. 1,468,600 dated September 18, 1923.

In operation my improved brake shoe is free to move upon its pivotal support consisting of the pin 2 upon actuation of the mechanism 23 to engage the brake lining 10 with the drum 20. Let us assume that the drum 20 is traveling in a clockwise direction (see Fig. 1) and the brake mechanism is applied. The right hand shoe by virtue of its engagement with the brake drum 20 must resist a relatively great force tending to move the shoe toward the pin. Here the thrust bearing surface consisting of each of the plates 8 and the plate 13 becomes active. The left hand shoe is subjected to force tending to draw the shoe away from the pin. The insert plate 13 of that shoe by virtue of its engagement with the pin 2 will prevent such movement of the shoe, so that the maximum efficiency of each of the shoes is maintained during operation.

Another most important feature of the structure set forth is that the shoe may be manufactured economically, not only because of the interchangeability of parts, but because the parts may be stamped from pressed steel, thus obviating the provision of castings and the finishing process necessary therefor.

It will also be noted that lateral movement of the shoes with respect to one another is positively prevented by the interlocking feature of the inserts.

I claim—

1. A brake shoe of the character described, having one end formed to provide a thrust bearing surface, a brake shoe mounting pin for engaging the bearing surface to support the shoe, and means cooperating with the shoe and said pin to retain said thrust bearing surface in engagement with the pin.

2. A brake shoe of the character described having one end formed to provide a thrust bearing surface, a brake shoe mounting pin for engaging the bearing surface to support the shoe and a member secured to the shoe for encompassing the pin to preclude disengagement of the bearing surface of the shoe with the pin and providing additional thrust bearing surface for the shoe against the pin.

3. A brake shoe of the character described having one end formed to provide a thrust bearing surface, a brake shoe mounting pin for engaging the bearing surface to support the shoe on its bearing surface, and a member carried by said shoe for encompassing said pin to preclude longitudinal movement of the shoe with respect to the pin.

4. A brake shoe comprising a pair of abutting plates formed with a brake lining supporting surface, said plates being separated from one another at their innermost ends, and an insert plate secured therebetween, said insert plate having an opening therethrough for receiving the brake shoe mounting pin, said plates having their inner end portions formed to provide thrust bearing surfaces for engagement with the pin.

5. A brake shoe of the character described comprising a pair of abutting plates fastened to provide a supporting surface for brake lining, said shoe having the plates at its inner end separated from one another, and an insert plate secured therebetween provided with an opening therethrough for receiving the brake shoe supporting pin, said brake shoe plates being provided with thrust bearing surfaces at their inner ends for engagement with the adjacent surface of the pin, said insert plate being offset so as to permit the introduction of a similar offset plate for a complement for a second brake shoe of similar construction to be mounted on said pin whereby the portions of the insert plates receiving the pin laterally contact one another.

6. A brake shoe of the character described having a thrust bearing at its innermost end for engagement with a brake shoe mounting pin, and an offset plate carried by said shoe at said inner end, and an opening therethrough for encompassing said pin whereby a second brake shoe of similar construction having an offset plate may be received upon said pin in longitudinal alignment with the first shoe.

In witness whereof, I hereunto subscribe my name this 9th day of March, 1927.

MALCOLM LOUGHEAD.